April 21, 1959 A. COLONNA 2,883,142
SELF-CLOSING ANTI-KNOCK FLUSHING VALVE
Filed Aug. 23, 1957 2 Sheets-Sheet 1
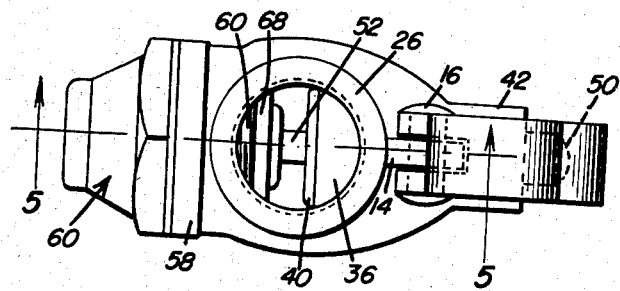
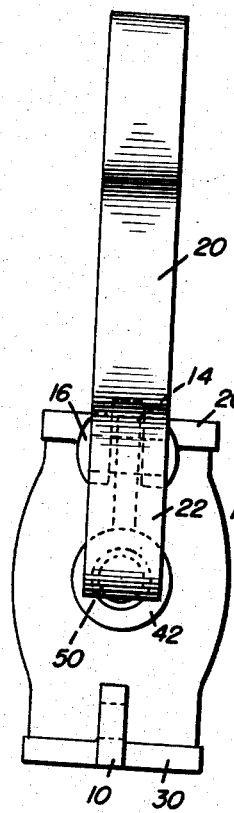
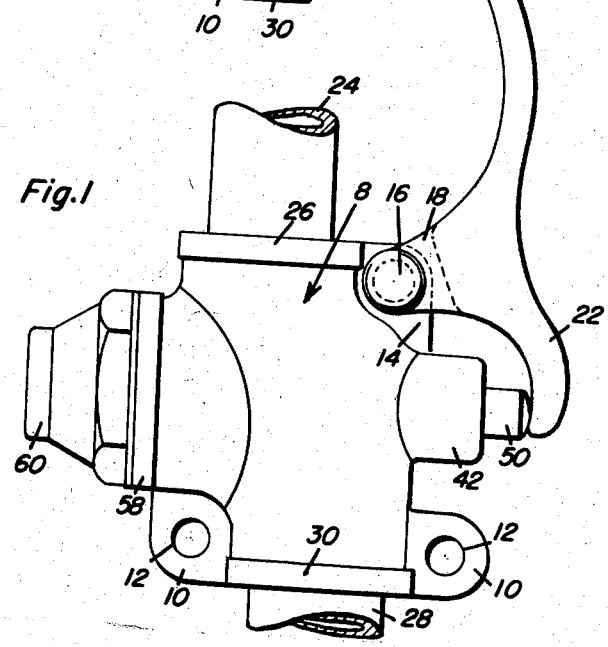
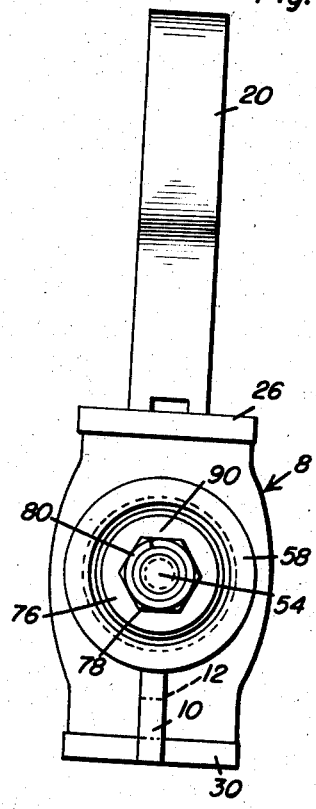
Angelo Colonna
INVENTOR.

April 21, 1959 A. COLONNA 2,883,142
SELF-CLOSING ANTI-KNOCK FLUSHING VALVE
Filed Aug. 23, 1957 2 Sheets-Sheet 2

Angelo Colonna
INVENTOR.

BY *[signatures]*
Attorneys

United States Patent Office 2,883,142
Patented Apr. 21, 1959

2,883,142

SELF-CLOSING ANTI-KNOCK FLUSHING VALVE

Angelo Colonna, Philadelphia, Pa.

Application August 23, 1957, Serial No. 679,844

5 Claims. (Cl. 251—51)

This invention relates to a new and improved self-closing delayed action flushing valve which is expressly, but not necessarily, designed and adapted for practical installation in the water delivery conduit or line of a flushable fold-away toilet, and the primary object is to permit the valve to open quickly but to close slowly, whereby to effectually prevent noisy knocking and to minimize water-hammer.

During the course of manufacturing and selling fold-away toilets and after using and experimenting with countless types of flush valves with limited efficiency and success, I have tried to obtain a suitable self-closing delayed action valve, but to no avail. With reference to my Patent No. 2,826,762 it will be seen that to do what is required, the valve performs its primary flushing job (as usual) but, in addition, must be such in construction that it functions to deliver a limited amount of water into the folding toilet to wet the bottom of the bowl when the bowl assumes its "down" ready-to-use position. Confronted with the need for a double purpose flushing valve has indeed posed a long recognized problem. However, I have now solved this problem by way of the novel valve construction herein revealed. On the other hand, I realize that the herein disclosed valve has numerous uses in many other lines of endeavor and hence the above explanation has been given merely to present the general background with reference to a specific need for a distinctively improved and reliable valve.

In carrying out the principles of the instant invention, I have evolved and produced a highly simple, practical and reliable valve construction which is characterized, generally construed, by a hollow valve body or casing having an interior chamber, communicating fluid intake and discharge connections and a partition in the chamber. The partition has a port therein affording communication between the chamber's intake and discharge portions. This partition is also provided with an annular valve seat to accommodate an opposing valving washer carried by a manually openable, self-closing valve. More particularly, the valve comprises a piston-valve wherein said washer is movable toward and from the seat. On one side, the valve body is provided with a readily applicable and removable screw cap which is fashioned into a cylinder and which has a closed end portion functioning as a dashpot. A coil spring in the dashpot portion bears at one end against the cap and at its opposite end against a cooperating end portion of the piston-valve.

The piston-valve is novel in that at the outward end it has a groove seating a shiftable packing ring, preferably an O-ring. The O-ring bears against a flange-forming stop washer when the valve is closed. It shifts away from the stop washer and is seated in the groove proper when the valve is open. The piston-valve has special passages therethrough and the stop washer has a restricted orifice cooperating therewith.

More particularly, the outward end of the piston-valve has a boss which spaces the washer away from the grooved end of the piston to provide a water circulating space. The washer is of a diameter less than the outside diameter of the piston-valve and the wall portions of the cylinder encircling the peripheral portion of the washer.

Other objects, features and advantages will become more readily apparent from the following description and the accompanying illustrative, but not restrictive, drawings.

In the drawings, wherein like numerals are employed to designate like parts throughout the views:

Fig. 1 is a side elevation of the improved self-closing, delayed action flush valve constructed in accordance with the principles of the invention and showing how it is installed and readied for use, the valve means (not shown) being closed.

Fig. 2 is a top plan view with the valve open (as seen in Fig. 6).

Fig. 3 is an end elevation, that is, a view observing Fig. 1 in a direction from right to left.

Fig. 4 is an end elevation observing the construction of Fig. 1 in a direction from left to right with the dashpot cap removed.

Figure 5:
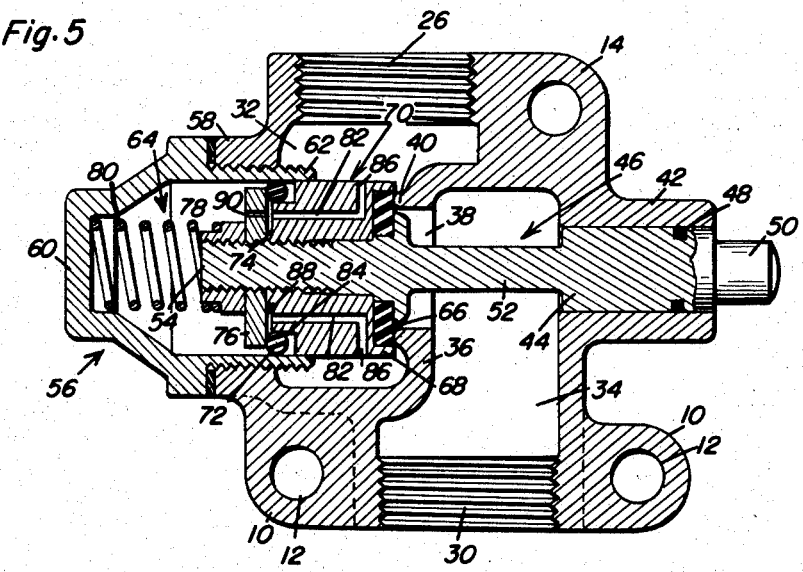
Fig. 5 is a section with portions in elevation, taken on the plane of the line 5—5 of Fig. 2, looking in the direction of the arrows, and wherein the piston-valve is shown in the closed position.
Figure 6:
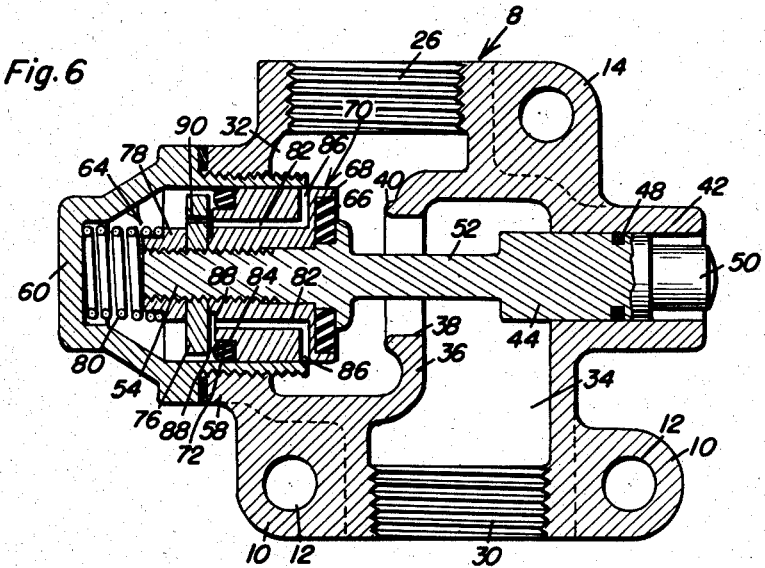
Fig. 6 is a view like Fig. 5 but showing the valve open.

Referring now to the drawings with the aid of reference numerals and lead lines, the valve case or body, as an entity, is denoted by the numeral 8 and it is of the configuration shown to advantage in Figs. 1 to 4, inclusive. Exteriorly, the body is provided with outstanding ears or lugs 10 apertured at 12, the upper lug in Fig. 1 denoted at 14 serving to accommodate the hinge pin or pivot 16 joining the median portion 18 of the flush valve lever 20 with the valve body. The lower trip finger of the lever is denoted at 22. The supply pipe is denoted at 24 and is connected with the fluid intake connection 26 at the upper portion of the valve. The complemental pipe 28 is connected with the lower discharge connection 30 (Figs. 5 and 6). Being of hollow construction, the body provides an internal chamber, one chamber portion being denoted at 32 and the other at 34. The interior divider or partition 36 has a valve port 38 therein and an outstanding annular rib forming a valve seat 40. To the right in Figs. 5 and 6 there is an outstanding neck or guide 42 for the guide portion 44 of the piston rod 46. The portion 44 is provided with a packing ring 48 and an outstanding extension 50 for the trip finger 22. The intermediate portion of the rod as at 52 spans the chamber portion 34, and the screw threaded portion 54 (Figs. 5 and 6) spans the chamber portion 32 and in fact projects into the detachable cap 56. This is a screw cap and it is threaded into the neck 58 and has a closed reduced end 60 and a screw threaded portion 62, which together form a cylinder and also a dashpot 64. The flanged portion of the rod is adjacent to the port 38 and serves as an abutment for a renewable valve washer 66 which engages the seat 40. This washer is mounted in a cup 68 at one end of the piston-valve 70. The piston-valve is threaded on the screw threaded portion of the stem and the left-hand end portion thereof is provided with a groove to accommodate the packing ring 72. The latter is preferably, but not necessarily, an O-ring. That is to say, a packing ring of some other cross-section may be satisfactorily employed. Beyond the grooved outer end, the piston-valve is provided centrally or axially with a spacing boss 74, against which the rigid metal stop washer 76 abuts. The stop washer is held against displacement by a nut 78 on the extreme threaded end portion of the stem or rod. This nut serves to accommodate one end portion of an expansion coil spring 80, the other end of the spring bearing against the closed end of the cap.

This composite type piston-valve (parts 70, 76, 78 and the attached rod or stem) adapts itself for reciprocation in the cylinder. It is unique in that at diametrically opposite points it is provided with substantially L-shaped passages. The long branch of each, denoted at 82, is parallel to the axis of the rod and spaced radially inwardly of the surrounding groove, that is, the ring groove 84. The short branch 86 is radial and opens through the inward end portion of the periphery of the piston-valve to the left of the cup 68. These L-shaped passages are constantly open and in communication with the chamber portion 32. The left-hand open ends of the long branches 82 open into a space 88 which intervenes between the washer 76 and the outer end portion 74 of the piston-valve. As already mentioned, the washer 76 is of an outside diameter less than the inside diameter of the cylinder and also less than the outside diameter of the piston-valve 70. However, the outer marginal portion of the washer is opposed to the piston ring groove 84, and thus the ring is movable back and forth in this groove and actually bridges and valves the outer margin of the space 88 when in the position seen in Fig. 5. An eccentric restricted orifice 90 is provided in the washer 76.

In operation, it will be seen that when the valve is normally closed, as seen in Fig. 5, the valving washer 66 is engaged with the seat 40. It is retained in this position by the compression spring 80 and the fluid (not shown) which is trapped in the dashpot portion 64. By reason of the L-shaped passages (82 and 86), the space 88, the spaced washer 76, and shiftable O-ring 72 in the arrangement depicted in the drawings, the O-ring is in contact with the abutment surface of the washer 76. This construction permits the valve to be pushed open readily and without restriction, and the fluid trapped in the dashpot portion 64 is allowed to escape or exhaust between the margin or periphery of the stop washer and cylinder and by way of the space 88 and the L-shaped passages. With the valve in the open position seen in Fig. 6, it will be evident that its closing stage is slowed down and delayed or retarded, as is the case in valves employing the dashpot principle. In the open position, the O-ring has shifted into the groove 84 proper uncovering the space 88 and opening the passages 82 and 86. It will be evident, therefore, that the L-shaped passages through the piston valve are there for the purpose of accelerating the opening of the valve when the stem or push rod is pushed in. By this action, the water which accumulates behind or to the left of the piston can quickly escape around the flange or washer 76 and through the L-shaped passages to permit the stem to travel free. The clearance space 88 between the washer and piston proper allows the passage of water in or out. The washer 76 having a small orifice opening when the pressure is released at the front of the valve results in a slow refill of the dashpot portion and the consequent retarded action eliminating sudden knock and noises.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A delayed action dashpot controlled anti-knock flush valve comprising a body having a chamber and a partition fixed in said chamber dividing the chamber into fluid intake and discharge portions, said partition having a valving port affording communication between said chamber portions, said port having a valving seat; a dashpot cylinder located at one side of the body, closed at its outer end and disposed in alignment with said port, and open at its inward end and communicating with the intake portion of the chamber, said body also having a valve rod guide on the other side of the body and communicating with said discharge portion, a piston-valve reciprocable in said cylinder, a coil compression spring fitted in the dashpot portion of the cylinder and interposed between the closed end of the cylinder and the adjacent outward end of said piston-valve, the inward end of said piston-valve having a cup provided with a valving washer normally engaging said seat and closing said port, the peripheral portion of the outward end of said piston-valve having a packing ring groove, a packing ring seated and shiftably movable in said groove and having wiping and sealing contact with encompassing wall portions of said cylinder, a push rod passing through said chamber and port and having one end operatively connected with said piston-valve and the other end projecting through and beyond said guide, said piston-valve having a filling and emptying passage for said dashpot cylinder, the inner end of said passage being communicable with the intake portion of said chamber and the outer end of said passage being communicable with the dashpot portion of said cylinder, said piston-valve being provided at its outward end with a packing ring stop spaced from the outward end of the piston and outward end of said passage, the outer marginal portion of said stop being opposed to and spaced outwardly from said groove and having a restricted orifice, said stop being of a diameter less than the inner diameter of said cylinder and defining and providing an endless passageway between said marginal portion and said cylinder, said passageway being communicable with the outer end of said passage by way of a space provided between the stop and adjacent outward end of said piston-valve, said shiftably movable packing ring serving to valve said space when the piston-valve is closed, and being shiftable away from and uncovering said space when the piston-valve is open.

2. The structure defined in claim 1, and wherein the passage in said piston-valve is L-shaped, the short branch being radial and opening through the peripheral surface of the piston-valve into the intake portion of said chamber and the long branch extending longitudinally through the piston-valve and opening through the outward end of the piston-valve, being located radially inward of the groove and opening into said space, said orifice being in general alignment with the outward end of said long branch.

3. The structure defined in claim 2, and wherein said piston-valve is also provided with a second L-shaped passage located diametrically opposite to the latter, the outward end of the long branch thereof also opening into said space, whereby said packing ring functions not only to encircle and close the perimeter of said space but the outward ends of both of said L-shaped passages.

4. A dashpot operated anti-knock flush valve comprising a valve body having a chamber and a partition in said chamber dividing the chamber into intake and discharge portions, said partition having a valving port affording communication between said chamber portions, a dashpot cylinder located at one side of the body and disposed in alignment with said port, a piston-valve reciprocable in said cylinder, said cylinder being closed at its outward end, a push rod passing through said chamber and port in the partition and having one end operatively connected to said piston-valve, that end of the rod adjacent said cylinder being screw threaded and provided with a nut, a coil spring in said cylinder interposed between the closed end of the cylinder and said nut, the outward end of said piston-valve having its peripheral portion provided with a packing ring groove, the inward end of said piston-valve being provided with a washer engageable with and movable toward and from said port, a portion of said piston-valve having an L-shaped passage, the long branch of said passage paralleling said push rod and the short branch communicating with the intake portion of said chamber, that end of the piston valve adjacent said nut having an axially projecting boss confined to a position spaced radially inward from the long branch of said L-shaped passage, and a washer mounted on the push rod between the nut and boss, said boss constituting a shoulder and serving to space the adjacent face of the washer from the adjacent end portion of the piston valve, said space affording communication between the long branch of the L-shaped passage and said groove, said washer being provided with an eccentrically disposed orifice radially inward of said groove and communicable with said space, said washer being of a diameter less than the diameter of the encompassing wall portions of the cylinder and providing a fluid space between itself and said wall portions, and a packing ring mounted in said groove, said packing ring being shiftably movable in said groove and having wiping and sealing contact with the encompassing wall portions of the cylinder, and being movable in a direction toward the washer and limited in its movement in that direction by way of said washer, said packing ring normally surrounding and covering the aforementioned space when the piston-valve is seated, and being movable in said groove in a direction away from said washer and uncovering said space when the piston-valve is open.

5. For use in a dashpot cylinder mounted for operation in the chamber of a valve body which has a partition in the chamber dividing it into intake and discharge portions and with a partition having a valving port affording communication between the chamber portions, a piston-valve which is adapted to be mounted for reciprocation in said cylinder, said piston-valve embodying an operating rod having a screw-threaded stem portion and provided at the inner end of the stem portion with a flange providing an abutment, said piston-valve being provided at one end with a cup containing a valving washer engaging the flange, the other end portion of said piston valve being provided with a groove, the outward axial end portion of said piston-valve being provided centrally with an axially projecting spacing boss, a washer mounted on said screw-threaded stem portion and engaging said boss and held in operable but movable position by an assembling and retaining nut also carried by the screw-threaded stem portion and engaging the washer, said washer being provided eccentrically with a restricted orifice, a portion of said piston valve having a filling and emptying passage with one end opening through a peripheral surface of said portion and the other end opening through an outer end of said portion opposed to an adjacent side of said washer and being disposed radially outward of the peripheral portion of said boss, said washer defining a fluid circulating space between itself and the adjacent end portion of said piston-valve and the outer end of said emptying passage opening communicatively into said space, the diameter of said washer being less than the cross-section of said piston-valve and the outer peripheral surface thereof terminating radially and inwardly of said peripheral surface, the outer marginal edge portion of said washer being opposed to and cooperating with said groove and providing a packing ring channel, and a packing ring arranged in said channel and of a cross-section less than the cross-section of the channel and operatively shiftable from one wall of the channel toward and from the outer marginal edge portion of said washer.

References Cited in the file of this patent

UNITED STATES PATENTS

| | | |
|---|---|---|
| 132,523 | Cooper | Oct. 29, 1872 |
| 1,142,917 | Simmons | June 15, 1915 |
| 1,459,460 | Yardley | June 19, 1923 |
| 2,781,997 | Berck | Feb. 19, 1957 |

FOREIGN PATENTS

| | | |
|---|---|---|
| 883,541 | France | Mar. 29, 1943 |